United States Patent
Etherington

[15] 3,677,680
[45] July 18, 1972

[54] FLUIDIC SENSING FOR MOLDING SYSTEM

[72] Inventor: Roger F. Etherington, Newport Beach, Calif.

[73] Assignee: California Injection Molding Co., Inc., Costa Mesa, Calif.

[22] Filed: Oct. 8, 1970

[21] Appl. No.: 79,174

[52] U.S. Cl. ..............................425/129, 264/40, 264/328, 18/2 HA, 18/30 CM, 18/36, 425/249, 425/138, 425/145, 425/169, 425/149, 425/152, 425/250

[51] Int. Cl. ..............................................................B29f 1/00

[58] Field of Search..............18/30 CK, 30 CM, 30 CS, 2 HA, 18/2 RM, 36, 16 C, 30 UM, 30 R; 164/344; 264/40, 328

[56] References Cited

UNITED STATES PATENTS

| | | | |
|---|---|---|---|
| 3,371,377 | 3/1968 | Budzich et al. | 18/30 UM X |
| 3,454,991 | 7/1969 | Rees | 18/30 R |
| 3,078,515 | 2/1963 | Wintriss | 18/2 HA X |
| 3,452,399 | 7/1969 | Blumer | 18/16 C X |
| 3,303,537 | 2/1967 | Mislan | 18/16 C X |

*Primary Examiner*—J. Spencer Overholser
*Assistant Examiner*—David S. Safran
*Attorney*—Gausewitz, Carr and Rothenberg

[57] ABSTRACT

An injection molding system for forming elongated thermometer covers having a metal tip employs fluidic sensing and fluidic control logic to provide alarm signals that prevent loading of molding compound into the mold cavity when the insert in one or more of a group of mold cavities is not properly seated and also prevent closing of the mold and insertion of an insert bearing mandrel when all inserts of a previous operation have not been withdrawn from the cavities. A vacuum drawn upon the hollow mandrels retains the insert in place upon the end of the mandrel, cools the mandrels, and cooperates with the fluid sensing devices to indicate the presence or absence of the inserts.

17 Claims, 5 Drawing Figures

Patented July 18, 1972

INVENTOR.
ROGER F. ETHERINGTON

BY Gausewitz, Carr
& Rothenberg

ATTORNEYS.

Fig. 2.

INVENTOR.
ROGER F. ETHERINGTON
ATTORNEYS.

FLUIDIC SENSING FOR MOLDING SYSTEM

BACKGROUND OF THE INVENTION

1. Field of the Invention

The present invention relates to molding systems and more particularly concerns molding systems in which certain alarm functions are performed by fluid sensing together with fluidic control logic.

2. Description of Prior Art

In the formation of many types of long slender articles such as, for example, pencils, pens, and thermometer cases, covers, and the like, it is necessary to mold a slender tubular body with a preformed insert secured at one end. In general the insert is placed in the mold cavity either together with or just prior to insertion of a movable mold mandrel, and that part of the cavity not filled by the mandrel and insert is then loaded with suitable molding compound. Then the mandrel together with the molded part and insert affixed thereto are all withdrawn. The molded part is stripped from the mandrel and the apparatus is ready for another cycle. For mass production of large numbers of such articles at high rates and low costs, a mold will often have a number of cavities and mandrels automatically operated and recycled at high rates. In some equipment, for example, the entire cycle of positioning the insert on the mandrel, closing the mold with the mandrel inserted, loading the cavity, withdrawing the mandrel and molded article, and stripping the article from the mandrel, may all be performed in as little as 15 seconds.

Smooth and continuous recycling operation is essential for economic production. However, because of variations in manufacturing tolerances of parts and equipment, contamination, wear and other factors, the described molding steps may not all occur as desired. For example, and particularly where automatic equipment is employed for emplacing the inserts upon the tip of the mandrel, it is possible that one or more of the mandrels of a group may not properly receive or seat the insert when the mandrels are about to be positioned within the mold cavities. Thus, the mold may be closed and ready for loading of molding compound but all cavities may not have properly positioned inserts. Continuation of the operation, namely the loading of molding compound into the cavity in such a situation will not only result in a defective part but may also result in damage to or contamination of the mandrel itself. Where the mandrel is hollow and inserts are positioned and retained thereon by means of a vacuum drawn through the mandrel, loading of molding compound into an end of the mandrel when an insert is not positioned thereon, may block the internal mandrel passage and prevent further use of this component.

Again, upon withdrawal of the mandrel together with the formed part thereon, it is possible that the insert may not have been securely attached to the molded part during the molding operation and accordingly will remain within the cavity upon withdrawal of the mandrel and the molded tubular part. In such a situation the cavity cannot be used again until the inadvertently retained insert is removed.

Heretofore, problems such as those indicated above have been noted and corrected only upon visual observation of the molding operation.

Although various types of sensing devices such as microswitches or minute pressure sensitive elements have been employed for remote sensing, none of these are applicable for the interior of a mold cavity.

Air gauging devices employing air sensors have been in use for many years. However, until the relatively recent advent of commercially available fluidic devices such as wall attachment bistable elements, beam deflector proportional amplifiers, and vortex amplifiers, fluidic techniques have not been applicable for combined sensing and control functions.

A wide variety of fluidic devices are now commercially available such as, for example, the line of fluidic industrial control modules produced and sold by Corning Glass Works of Corning, N.Y. Such devices like the pneumatic proximity detecting device shown in U.S. Pat. No. 3,258,023 to R. E. Boles, employ and are useful with pure fluid systems for both sensing and performing control or logical functions. A text entitled *Fluidic Systems Design Guide*, published by Fluidonics Division of the Imperial-Eastman Corp., 6300 W. Howard St., Chicago, Ill., describes various fluidic devices, theories, and accessories, suggesting several fluidic control applications. Although such fluidic devices are provided in many forms, they have not heretofore been used or suggested for use in connection with molding systems.

Accordingly, it is an object of the present invention to provide a fluidic sensing and fluidic control logic system for a molding operation which system has high reliability, high speed operation, simplicity of manufacture, low maintenance, and high efficiency.

The fluidic sensing and fluidic control logic of the present invention is applicable to many different types of systems where it is necessary or desirable to detect and signal the presence or absence of an object or body. The described system is particularly useful for providing a desired output signal, whether for alarm or control purposes or both, that indicates either the absence of one or more of a group of objects or the presence of one or more of a group of objects. However, for purposes of exposition and in particular because the present invention has been fully embodied in an automatic injection molding system, it will be in connection with such a system that an embodiment of the principles of the present invention will be described.

SUMMARY OF THE INVENTION

In a molding system wherein a plurality of inserts are emplaced in a mold before loading with molding compound and thereafter withdrawn from the mold, a fluidic control system is provided for preventing either or both of closing of the mold or loading of molding compound when, respectively, one or more inserts remain in the mold, or one or more inserts have not been properly positioned in the mold. Such fluidic control system comprises fluidic control logic means having pressure inputs dependent upon positioning of the insert within each of the mold cavities for generating a first alarm signal to actuate a mold drive switch and prevent closing of the mold when an insert is positioned within one or more of the cavities, and for generating a second alarm signal to actuate a loading switch and prevent loading of molding compound when one or more of the mold cavities does not have an insert properly positioned therein.

MOLDING SYSTEM

Figure 1:
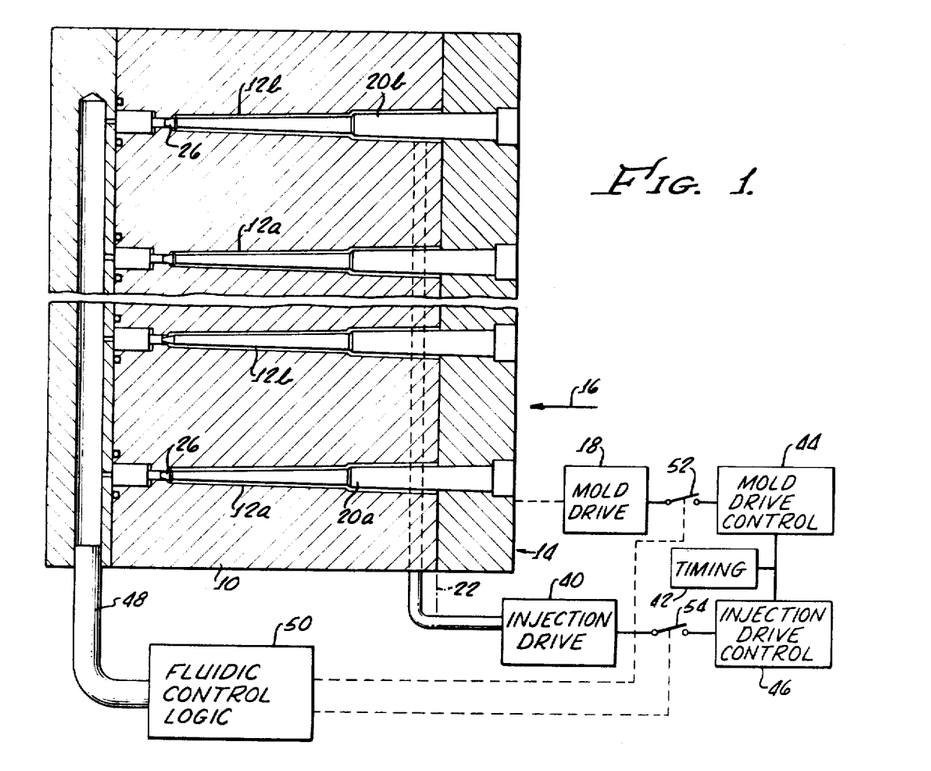
FIG. 1 is a block diagram of portions of a drive system and including fluidic control logic for an injection molding system embodying principles of the present invention.

The molding system for which the fluidic sensing and control of the present invention is particularly adapted is described in detail in a copending application for Method and Apparatus for Molding Articles Containing Inserts, Ser. No. 79,191, filed by Blair E. Howe and Roger D. VanDeWalker, inventors, on Oct. 8, 1970, and assigned to the assignee of the present application. The disclosure of such copending application is fully incorporated herein by reference. For a brief description of those portions of the molding apparatus of the copending application as are necessary for an understanding of operation and application of the present invention, reference is made to the illustration of FIG. 1. FIG. 1 comprises a simplified showing of the molding apparatus and those portions of the mold plate drive and molding compound loading drive that are under control of the fluidic sensing and logic of the fluidic control system to be described herein.

The apparatus of FIG. 1 is arranged to produce in large quantities and at exceedingly low cost, inexpensive covers, preferably disposable, for a probe such as an oral thermometer. A stationary mold body 10 is formed with a plurality of elongated cavities 12a, 12b. A movable plate assembly 14 that includes a stripper plate (not shown) is mounted for linear motion in the direction of arrow 16 under control of a mold drive 18. Plate assembly 14 fixedly carries a plurality of mandrels or cover cores 20a, 20b (core pins) which are positioned so that an individual one of each of the cores will enter a corresponding cavity of mold body 10 when the mold is closed and the plate assembly 14 is in the position illustrated in FIG. 1, adjoining the mold body 10 along the surface of parting line 22.

Figure 2:
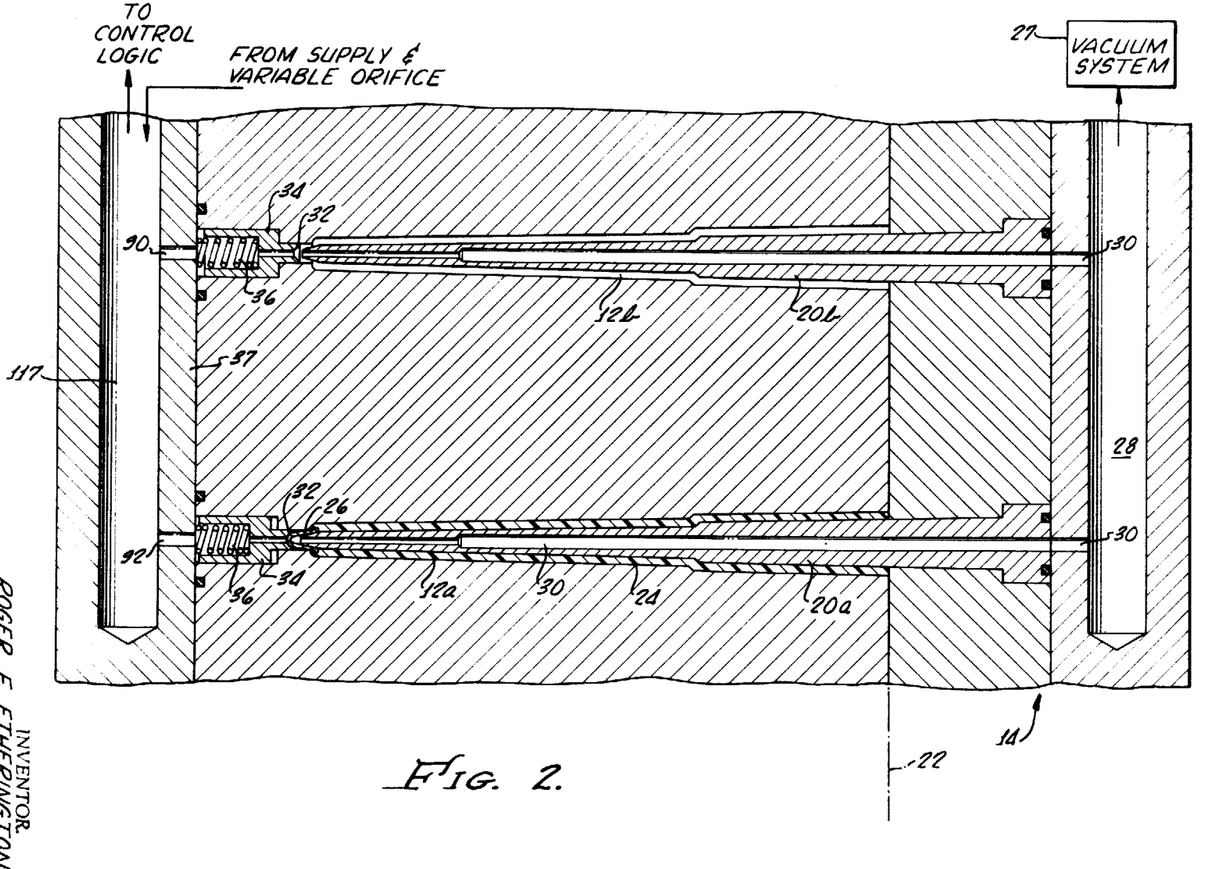
FIG. 2 is a detailed sectional illustration of one pair of a group of mold cavities with the cavities shown in different conditions.

The parts that are formed in the described molding apparatus are hollow metal-tipped covers of which one is illustrated in place within the mold cavity in FIG. 2. The part comprises a hollow body 24 formed of the molding compound that is injected into the several cavities and has a somewhat conically shaped metallic tip 26 securely affixed thereto during the molding operation. The tip 26 is herein referred to as the mold component or mold insert that is emplaced within the mold cavity before loading the latter with the molding compound.

In the described injection molding system and as more particularly explained in the above-identified copending application, the mold plate assembly together with the mold mandrels 20 carried thereby, are displaced from the mold body 10 along parting line 22 a distance sufficient to have the tip of the mandrel (and the mold insert) completely clear of the surface of mold body 10 at the parting line. In this position each mandrel has loaded thereon an associated insert 26. Details of the means of positioning and loading of the insert upon the mandrels are described in the above-identified copending application. The inserts are retained in place by means of a relatively high vacuum of, for example, 22 inches of mercury, provided from a vacuum system 27 to a manifold chamber 28 (FIG. 2) having fluid communication with passages 30 formed in and extending entirely through the length of each mandrel 20.

As will be more particularly pointed out below, the vacuum drawn through the mandrels performs a number of different functions including cooling, retention of the inserts and sensing of insert position.

With an insert 26 loaded upon the tip of each of the mandrels 20, the movable mold plate assembly 14 together with the insert loaded mandrels is then moved under control of mold drive 18 to insert the mandrels and the inserts into the respective cavities to the position illustrated in FIG. 2. Solely for purposes of exposition, FIG. 2 illustrates both mandrels of a pair positioned fully within respective cavities, but one mandrel is shown with a completely formed part, whereas the other is shown with neither insert nor plastic part body. In this position, the insert 26 engages a seat 32 of a plug 34 that is mounted for a limited sliding motion within an enlarged end of the cavity of the mold body 10.

A spring 36 is carried within and bears against one end of a hollow of the plug 34 and at its other end bears against a fixed plate 37 that is secured to and seals the closed end of mold body 10. As indicated in connection with cavity 12b of FIG. 2, plug 34 is urged toward the right in the drawing by the action of spring 36 and will remain there until it is pressed toward the left to the position illustrated in connection with cavity 12a. The plug is moved to the latter position as the mandrel 20a and insert 26 are inserted. The insert engages seat 32 of the plug moving the latter against the compression of the spring to ensure firm engagement and positioning of the insert 26.

Referring again to FIG. 1, with plate assembly 14 and the mandrels and inserts thereon inserted into the mold body 10, and assuming that all parts are properly positioned, an injection drive schematically illustrated at 40 is operated to feed molding compound which is loaded into all of the cavities 12 through suitable mold compound conduits. The repetitive recycling operations of opening the mold, mounting inserts on the mold mandrels, closing the mold to position the inserts and mandrels, and thereafter loading the cavities with mold compound and then withdrawing the mandrels together with the molded parts thereon, are all automatically performed by means more particularly described in detail in the above-identified copending application. In general, the automatic operation is under control of a timing generator 42 which sends timing signals to a mold drive control 44 and an injection drive control 46. It may be noted that all other automatic operations of the apparatus that are not shown herein, such as the feeding of inserts, loading of the inserts upon the mandrels and the stripping of the finished parts from the mandrels after withdrawal from the mold, are also automatically controlled by apparatus that is described in the above-identified patent application. Description of these is not necessary for an understanding of the present invention.

It will be readily understood that although the present invention is most particularly adapted for and finds greatest utility with an entirely automated molding system, it may nevertheless be applicable with systems of lesser sophistication having lesser or no automation. It will be understood, of course, that a mold opening drive (not shown) also operated by the mold drive control 44, is provided to achieve withdrawal of the movable plate assembly 14 and the mandrels together with the formed parts at the appropriate point in the system cycle.

For automatic operation, mold drive control 44 provides signals at proper times to drive the plate assembly 14 in a direction to either open the mold (via a drive not shown) or close the mold via drive 18, depending upon the particular point in the molding cycle. Similarly, injection drive control 46 provides an operating signal to injection drive 40 to effect loading of molding compound into the mold cavities when the mold is closed with the mandrels and inserts positioned in the cavities.

ALARM SYSTEM

Among the various problems that may be encountered in operation of a molding system of the type described above, are major difficulties that may be caused by possible improper positioning of mold inserts 26. In a typical molding system, a number of cavities are formed in the mold body 10. It has been found that a mold body having 16 cavities and, accordingly, capable of simultaneously forming 16 probe covers is a feasible arrangement. It will be readily appreciated that as the number of simultaneously formed parts is increased, the probability of improper operation is likewise increased. Accordingly, when the mold is closed, mandrels inserted, and the system is ready for loading of molding compound, all of the inserts must be in place. Each cavity must have a properly emplaced insert 26. If but a single one of the cavities does not have an insert emplaced upon the seat of its movable plug 34, the subsequent loading of molding compound not only will form a defective part, but will render the apparatus unfit for subsequent use, until repairs are made. In particular, because of the various passages and conduits in the several parts, injection of molding compound in the absence of a properly positioned insert 26 may well block the various passages, thus requiring a shut down of the equipment and cleaning, repair, or replacement of one or more parts.

As another possibility, if one of the inserts 26 is not adequately adhered to the body of the molded part in the course of the molding operation, opening of the mold and withdrawal of the mandrel and part may not withdraw all of the inserts. It is possible, thus, that one or more of the inserts 26 may remain seated upon the seat of plug 34 when the mold is open. Since the operation is such as to strip all parts from the mandrels after the mold is open and then automatically emplace a new insert upon the tip of each mandrel, it will be seen that subsequent closing of the mold would result in a compression of not one but two inserts between plug 34 and the mandrel in that cavity from which the insert had not previously been removed. This may prevent proper closing of the mold, may damage the mandrel, or the cavity, or may result in some combination of these problems. In any event, the repetitive recycling must be stopped as soon as possible and preferably prior to any closing of the mold when an insert remains within the cavity.

It is to the above-described problems of improper insert positioning that the present invention as applied to an injection molding system is most particularly directed. In accordance with principles of the present invention, fluid pressure sensing means is provided to sense the presence or absence of an insert on the seats 32 of each cavity plug 34. Several fluid pressure signals are fed via a group of conduits collectively indicated at 48 in FIG. 1 to provide inputs to a fluidic control logic system 50. The latter, in effect, provides a logical analysis of the pressure signals received from the several cavities via conduits 48 and provides output signals to respectively actuate switches 52 and 54 to disable the mold drive and injection drive respectively. In effect, the fluidic control logic actuates (opens) switch 52 to disable the mold close drive 18 when any one or more of the inserts are positioned upon the seat of the cavity plug. Similarly the fluidic control logic actuates (opens) switch 54 to disable the injection drive when one or more of the inserts are not properly positioned upon the seat of the spring plug 34. These functions are achieved in general by the fluidic system illustrated in FIG. 4.

Figure 3:
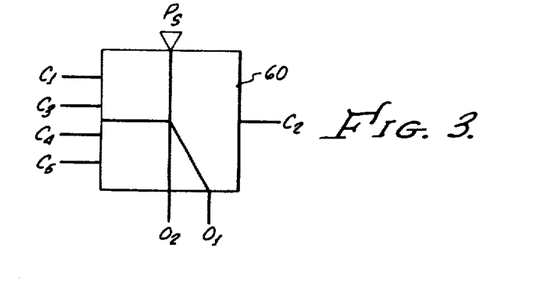
FIG. 3 is a schematic illustration of a typical fluidic switching device employed in the fluidic control logic of FIG. 1.
Figure 4:
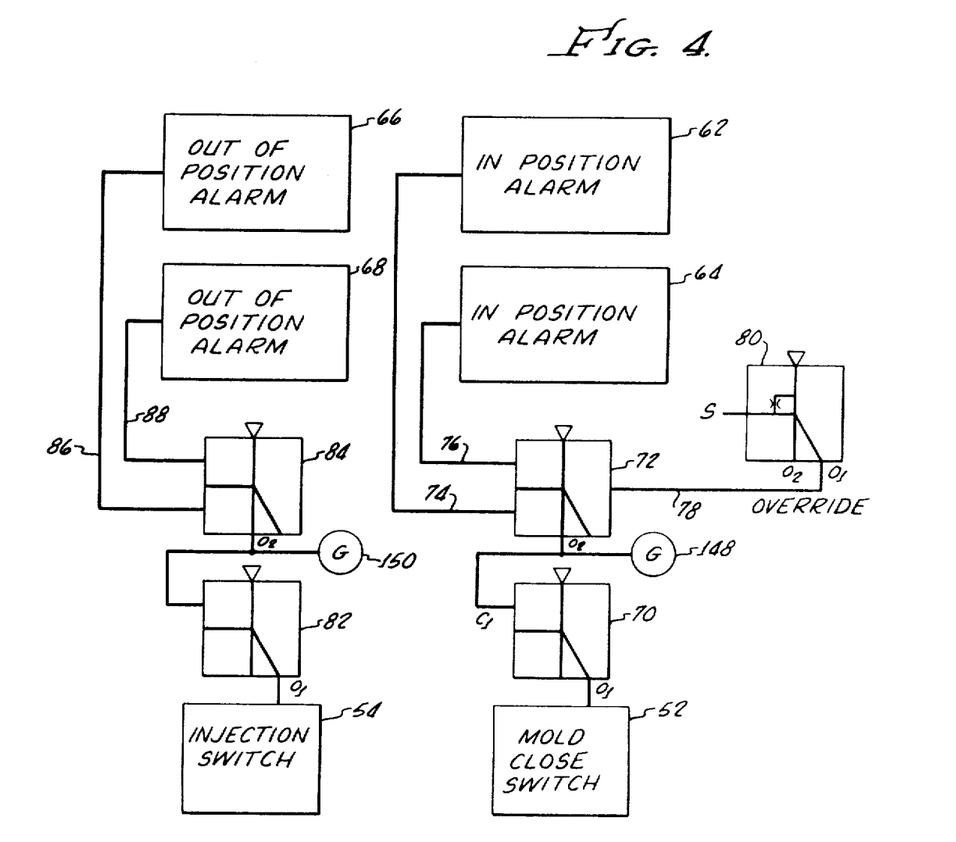
FIG. 4 is a block diagram of the fluidic control logic of FIG. 1.

The system of FIG. 4 employs fluidic switching devices or gates of types that are well known and commercially available. For example, the fluidic industrial control modules (FICM components) manufactured by Corning Glass Works of Corning, N.Y., may be employed in the performance of the logic operations of the present invention. A typical one of such components is schematically illustrated in FIG. 3. The component in general comprises a body 60 generally in the form of a flat block of about 2 by 3 inches and formed with a plurality of fluid passages indicated by the lines extending across the block. An input pressure $P_s$ is provided at a value of about 5.0 psig. The device is formed with a plurality of outputs indicated at $O_1$ and $O_2$, and a number of control inputs indicated by $C_1$, $C_2$, $C_3$, $C_4$ and $C_5$. The device illustrated in FIG. 3 is an inhibited OR gate. Where the input designated $C_2$ is removed from the schematic illustration, the illustration would represent an OR/NOR gate.

Considering the component of FIG. 3 as an OR/NOR gate, that is, without any input arrangement, at $C_2$, the device has a stable state in the presence of a supply input $P_s$ that provides a pressure output at $O_2$. When a control input in the form of a pressure is applied at any one of control inputs $C_1$, $C_3$, $C_4$, or $C_5$, or at any combination of such inputs, output $O_1$ switches on and output $O_2$ switches off. In other words, with control input pressure at one or more of the inputs, an output pressure is provided at $O_1$ instead of at $O_2$. The output returns to $O_2$ and is removed from $O_1$ when all control inputs are absent. A pressure applied at any one of the control inputs or at some or all of them acts against the internal air stream at the junction of the several internal passages and forces the output to be switched to $O_1$. The output is held and remains at $O_1$ as long as sufficient pressure remains at one or more of the control inputs. In general, the switching pressure at the control inputs is of a value of about 10% $P_s$, but not exceeding 30% $P_s$. Output will switch back from $O_1$ to $O_2$ when control input pressure drops to a value, termed a return pressure, of about 2% $P_s$. Thus, with a supply pressure of 5.0 psig, the output is switched from $O_2$ to $O_1$ when one or more of the inputs has a pressure value of 0.5 psig or more. The output switches back and the device returns to its unswitched position from $O_1$ to $O_2$, when the control inputs drop below a value of 0.10 psig. Accordingly, control signals in such a circuit are considered "ON" at a discrete level of 0.5 psig or higher, and are considered "OFF" at a discrete level below 0.1 psig. When the device is in switched condition, with output at $O_1$, it will remain there until the control input drops to the return pressure of 0.10 psig.

Where the device is at an inhibited OR gate, the input labelled $C_2$ is provided. An input pressure at input $C_2$ inhibits switching of the device. Thus, even if one or all of control inputs $C_1$, $C_3$, $C_4$ and $C_5$, have a sufficient switching pressure thereon, if a pressure is also applied at $C_2$, no switching occurs and the output remains at $O_2$.

These OR/NOR gates and inhibited OR gates, together with other conventional fluidic devices employed in the fluidic control logic of the described embodiment of the present invention are described in further detail in a brochure entitled, "Logic Components, Fluidic Industrial Control Modules," published by Corning Fluid Products of Corning Glass Works, Corning, N.Y.

FLUIDIC CONTROL LOGIC

Fluidic control logic 50 of FIG. 1 is illustrated in block form in FIG. 4 as comprising first and second in-position sensing and switching apparatus 62, 64, details of which will be described below, and first and second out-of-position alarm sensing and fluidic switching devices 66 and 68, similarly described below in further detail. The position alarm apparatus feeds fluid pressure signals to a group of fluidic switching devices that are connected to operate the respective mold close disabling switch 52 and injection drive disabling switch 54. The series connection between disabling switches 52, 54, and the respective drives and controls is shown for purposes of exposition. These switches may be electrically connected in various well known arrangements to perform the described disabling functions.

Switches 52 and 54 are pressure actuated microswitches of well known types, details of which need not be described. These are switches that make or break an electrical circuit and are adapted to be actuated by means such as, for example, a pressure receiving diaphragm, in response to an input pressure applied thereto. Thus, mold close switch 52 is a normally open switch, that is, a switch having a normally high electrical impedance, that is adapted to be held in closed or low impedance condition on receipt of a pressure input from the $O_1$ output of a fluidic switching device 70. During operation of the circuit, switching device 70 has a steady supply provided at supply input $P_s$ and also has a steady input provided to its control terminal $C_1$ whereby it provides a steady switched output at $O_1$ to hold mold close switch 52 in its normally closed condition. The control input $C_1$ to switching device 70 is provided from the $O_2$ output of an inhibited OR gate 72 having first and second control inputs provided via lines 74, 76, from the first and second in-position alarm apparatus 62, 64. Fluidic switching device 72, just as are all of the other fluidic switching devices described herein, is continuously provided with a supply pressure at the input labelled $P_s$ in FIG. 3.

An inhibit input is provided to switching device 72 via a line 78 that is connected to the $O_1$ output of a fluidic back pressure switch 80. Back pressure switch 80 is a convenient manual override in a fluidic system. It is arranged to normally provide an $O_2$ output that is switched to $O_1$ upon blockage of its command input S. Input S is conveniently blocked by simply placing an operator's finger over the appropriate opening in the block. Accordingly, in the absence of control inputs on lines 74, 76 to switching device 72, the later provides an $O_2$ output that in turn feeds a signal to the control input of switching device 70, which, accordingly, provides an output to hold the mold close switch in closed position.

On receipt of a signal in either line 74 or 76, switching device 72 no longer provides a control input to switching device 70 which, accordingly, removes the holding input to switch 52 and the latter is thereupon opened. Thus, the mold may not be closed when a signal exists in either of lines 74, 76, or both.

For the purpose of a manual override in the presence of a control input to switching device 72, back pressure switch 80 is operated to switch its output to $O_1$ and provide an inhibit input to device 72. Thus, the latter will provide its $O_2$ output to hold the switch 52 in closed position even though alarm devices 62, 64 indicate that inserts are improperly positioned within the mold. Such override may be necessary for repairs or other testing of the mold operation.

Injection switch 54 and its operating circuitry are substantially the same in structure and arrangement as the previously described switch 52 and its operation. Switch 54 is a conventional pressure actuated electrical switch normally in open, high impedance condition that is arranged to be held in closed, low impedance condition by a pressure signal input thereto from the output $O_1$ of a fluidic switching device 82. The latter is arranged to provide its $O_1$ output by means of a substantially continuous control input thereto from the $O_2$ output of a fluidic OR gate 84. No inhibit or override control is needed for gate 84. Control inputs are provided to gate 84 via lines 86, 88 from out-of-position alarm arrangements 66, 68 when one or more of the inserts are not properly seated or emplaced upon the seat 32 of its cavity plug 34 (FIG. 2).

Thus, FIG. 4 illustrates the arrangement by which a pressure signal on any one of the lines 74, 76, 86, 88 will effect operation of the respective switches 52, 54 to prevent closing of the mold or to prevent loading of molding compound.

Figure 5:
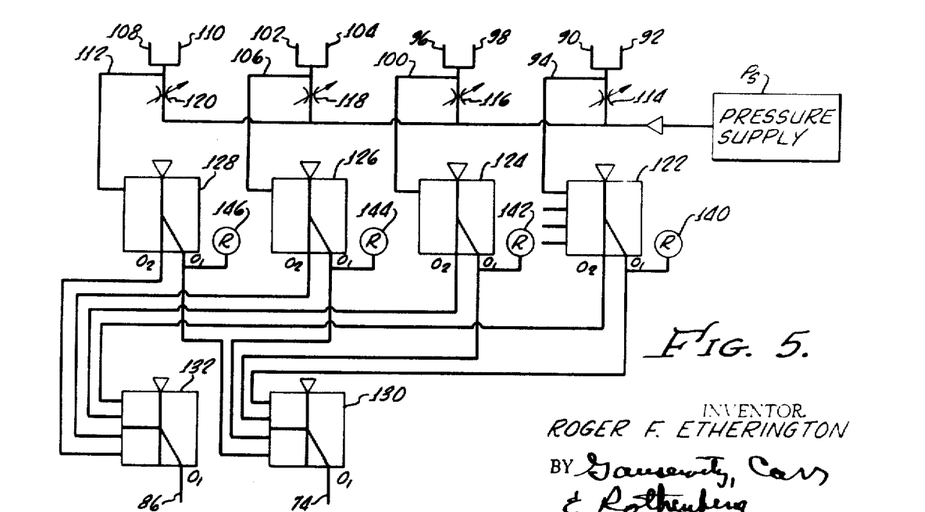
FIG. 5 is a schematic illustration of details of parts of the in-position alarm and parts of the out-of-position alarm sensing of the control logic of FIG. 4.

The arrangement illustrated in FIG. 5 when taken in conjunction with details shown in FIG. 2, illustrates a unique arrangement employed in the present invention that will provide as many as eight or more pressure sensing points that are collectively analyzed to yield a single alarm signal indicative of the condition of any one or more of the points sensed. The fluidic circuit illustrated in FIG. 5 includes one-half of the 4-position alarm boxes schematically indicated in FIG. 4. The FIG. 5 circuit is typical of the combination of one of the in-position alarm boxes such as 62 together with one of the out-of-position alarm boxes 66. An additional fluidic circuit identical to that illustrated in FIG. 5 provides the function of the second pair of alarm boxes of FIG. 4, namely, in-position alarm 64 and out-of-position alarm 68. Since the two fluidic circuits are identical, FIG. 5 illustrates only that comprising in-position alarm 62, together with out-of-position alarm 66.

The circuit of FIG. 5 is capable of sensing presence or absence of an insert on eight different seats in eight different mold cavities of mold body 10 of FIG. 2. The group of eight cavities schematically illustrated in FIG. 5 is divided into four sets of two sensing orifices each. In this embodiment there are two orifices and two cavities in each set. Thus, in this group, a first pair of orifices 90, 92, are connected in common to a sensing line 94. Sensing orifices 96, 98 are connected in common to a sensing line 100. Sensing orifices 102, 104 are connected in common to sensing line 106, and sensing orifices 108 and 110 are connected in common to a sensing line 112. All orifices are supplied with the pressure of 5 psi from a pressure supply $P_s$ via respective individually adjustable orifices 114, 116, 118, 120.

Details of a pair of sensing orifices and supply therefor are shown in FIG. 2. For example, sensing orifices 90 and 92 are formed in the bottom or the mold sealing plate 37 to communicate via the interior of spring plugs 34 with the passages formed in the plugs and thus, to communicate through the seat of the plug with the passage formed in mandrels 20 when or if inserts 26 are not emplaced. A passage 117 is formed in the mold end plate 37 in fluid communication with orifices 90, 92, and is connected by suitable fittings (not shown) to the sensing line 94 shown in FIG. 5. Passage 117 is furnished with the 0.5 psig supply pressure via adjustable orifice 114 shown in FIG. 5.

Particularly because of their length and small diameter, core pin passages 30 are coupled via manifold chamber 28 to the relatively high external negative pressure (vacuum) system 27. This coupling greatly enhances the distinction among the different levels of pressure signals in the several sensing lines that represent the different insert positions to be detected. As described in detail in the above-mentioned copending application, this vacuum also functions to cool the apparatus and to hold the inserts upon the free end of the core pins.

The arrangement is such that when neither insert is present in the two cavities of the illustrated pair, pressure at orifices 90, 92, is less than the return pressure. More specifically in such case, pressure in passage 117 is in the order of two inches of water, which is less than 0.10 psig. Therefore, any switching device having a control input from line 94 will be in unswitched ($O_2$) state.

When one insert is present in one cavity of a set and an insert is missing from the other cavity of such set, the pressure in sensing line 94 (connected to passage 117) is intermediate the 0.5 psig switch pressure and 0.10 psi return pressure, having a value between 6 and 10 inches of water. This is not high enough to switch any one of the fluidic switching devices employed herein. Nevertheless, it is not low enough to allow a switched fluidic device to return to its $O_2$ output state. Thus, with a pressure of 6 to 10 inches of water in the sensing line, a switching device that was previously in a state providing an $O_2$ output will remain in that state and, concomitantly, a switching device that was previously in a switched state providing an $O_1$ output, will likewise remain in such switched state.

When and only when both inserts are present in both cavities of a pair, the pressure in sensing line 94 rises above the 0.5 psig switch pressure to a value of approximately 130 inches of water in the described arrangement, and thus provides a control input of sufficient magnitude to switch the described fluidic devices from $O_2$ to $O_1$ outputs.

Each of the other orifice pairs 96, 98, 102, 104, and 108, 110 are connected and arranged with respect to a different pair of mold cavities just as are the orifices 90, 92 whereby each of sensing lines 94, 100, 106 and 112 will provide a pressure equivalent to 2 inches, 6 to 10 inches or about 130 inches of water when both inserts are missing, one insert only is missing, or both inserts are present, respectively. The several sensing lines 94, 100, 106, and 112 are connected respectively as control inputs to fluidic OR/NOR gates, 122, 124, 126 and 128 as shown in FIG. 5. Although these devices are conveniently available OR gates, the other control inputs thereof are not needed nor are they employed. Accordingly, devices 122 through 128 function solely as fluidic switching devices.

Fluidic switching devices 122 through 128 each provides a switched $O_1$ output to a fluidic OR/NOR gate 130 and each provides its unswitched $O_2$ output to a fluidic OR/NOR gate 132. It is to the $O_1$ output of gate 130 that sensing line 74 is connected. Sensing line 86 of FIG. 4 is connected to the $O_1$ output of gate 132.

Normally (e.g., no alarm) the output of each of switching devices 122, 124, 126 and 128 is provided at $O_2$ to one of the control inputs of OR gate 132. Accordingly, in the absence of a switching input to the control input of any one of switching gates 122, 124, 126, 128, OR gate 132 provides an $O_1$ output on line 86 that is sufficient to switch fluidic gate 84 to thereby remove the control input from switch 82. The latter no longer provides an $O_1$ output and accordingly actuates the injection switch to prevent loading of molding compound. Switching devices 122 through 128 provide the $O_2$ output thereof to disable injection of molding compound in the absence of an input on their control line. Input is absent on such control line when both of the inserts of a pair of cavities are missing.

The switched or $O_1$ outputs of OR gates 122, 124, 126, and 128 are collectively fed to OR gate 130, which, accordingly, provides a switched $O_1$ output on line 74 when any one or more of its inputs receives a control signal. An $O_1$ output from OR gate 130 appears on line 74 as a control input to the inhibited OR gate 72 (FIG. 4) to thereupon switch the output of the latter to $O_1$, removing the control input from switch 70 and removing the holding pressure signal from switch 52. Thereupon the latter opens to disable closing of the mold. A control input is provided on the sensing line 94, 100, 106 or 112 when both inserts are present, whereby the sensing line receives a signal having a pressure gate greater than the required switch control input pressure.

As previously described, absence of both inserts of any of the sensed pairs of cavities will prevent injection and presence of both inserts of any of the sensed pairs will prevent mold closing. It is also necessary to prevent injection when only one insert of any pair is present under certain conditions and, further, to prevent mold closing when under certain conditions only one insert of any pair is present. Stated otherwise, it is sometimes necessary to prevent injection when one insert of a pair of cavities is missing, the other being present, and it is sometimes necessary to prevent mold closing under like conditions. To accomplish this result, employing a minimum of components, the present invention makes use of the fact that a significant difference exists between the switch pressure (required to switch the output of the fluidic device from its $O_2$ to $O_1$ condition) and the return pressure (below which the control input must drop before the switched device will return to its $O_2$ output). From one point of view, the fluidic switching device may be considered to have a partial memory or, in another analogy, a kind of hystersis.

Writing the above in logical notation, operation of the injection and mold switch occurs under the following conditions:

$$X = AA + AA \rightarrow AB + AA \rightarrow BA \quad \text{(Eq. 1)}$$

$$Y = BB + BB \rightarrow AB + BB \rightarrow BA \quad \text{(Eq. 2)}$$

Where X is injection alarm, Y is mold close alarm, A is absence of one insert of a pair, AA indicates absence of both inserts of a pair of cavities, B indicates the presence of one insert, BB indicates presence of both inserts of a pair of cavities, and AB and BA both indicate the presence of one insert of a pair and a concomitant absence of the other insert of a pair. The symbol → indicates that the second condition, at the point of the arrow, follows or occurs subsequent to occurrence of the first condition, at the tail of the arrow. The symbol + is logical OR.

Thus, the logical conditions as set forth in Equation 1 state that a signal X is fed to actuate the injection switch and prevent loading of molding compound when both inserts are absent from the cavities of a single pair of cavities such as, for example, the mutually connected pair 90, 92, or when one of the inserts is absent and the other is present following a condition wherein both have been absent. Similarly, Equation 2 states that the mold switch will be actuated to prevent closing of the mold when inserts are present in both mold cavities of the commonly connected pair or when, following a condition wherein both inserts had been positioned properly within both cavities of a commonly connected pair, only one insert is absent or only one insert is present.

Logical condition AA represents an actual pressure in sensing line 94 of 2 or less inches of water. Condition BB represents an actual pressure of about 130 inches.

The logical AB condition of the above equations represents a pressure in sensing line such as line 94 of from 6 to 10 inches of water as previously indicated. This pressure is between the roughly 12 or more inches of water required to switch the device and the 2 or less inches of water required to allow the switching device, once switched, to return to its $O_2$ output condition. Accordingly, when one and only one insert is present in a pair of commonly connected cavities, that one of switching devices 122, 124, 126, and 128, that is connected to sense that particular pair, will remain in the state in which it had been previously established. Only when both inserts are present or both inserts are absent will the fluidic device change its condition.

Explaining the above-stated logical conditions in terms of actual operation of the equipment, it will be seen, of course, that when the condition BB exists and both inserts are present, the mold should not be closed because upon closing of the mold, a new insert is emplaced within each cavity. Similarly, during the molding compound loading step, both inserts of a pair of cavities are properly placed to provide the BB condition to the fluidic device and thus switch it to its $O_1$ condition. If, upon subsequent opening of the mold, both of the inserts of a pair of cavities are not withdrawn, there occurs the condition AB following the previous BB condition and the particular fluidic device that is arranged to sense the cavities of the now improperly conditioned pair of cavities will remain with its output in $O_1$ condition whereby the mold can no longer be closed.

Similarly, with regard to alarm and control of loading of molding compound, prior to closing of the mold, both inserts of a pair of cavities were absent (AA) or the mold would not be able to close. Now assuming that an insert has not been properly emplaced upon the tip of one of the mandrels, upon closing of the mold there may be one or more inserts missing (AB). Thus, the condition AB will follow the condition AA and the system operates to prevent loading of molding compound. Of course, if the condition AA exists indicating both inserts of a pair are missing, loading is likewise disabled.

As previously described, the arrangement specifically shown in FIG. 5, encompasses position alarms identified as 62 and 66 in FIG. 4 to provide alarm signals on lines 74 and 86, respectively. In a molding system employing a mold body with sixteen mold cavities for simultaneously forming sixteen probe covers, the arrangement of FIG. 5 is duplicated for the second group of eight pairs of cavities and sensing orifices to provide alarm signals on sensing lines 76 and 88, respectively, for mold close switch operation and injection switch operation.

In order to provide visual monitoring of operation of the described fluidic system and to facilitate location of an error (since the described alarming operation and actuation of switches 52, 54, may occur when only one of the sixteen cavities is not properly conditioned) visual indicators are provided for the various fluidic devices. These indicators are identified at 140, 142, 144, and 146 of FIG. 5 and at 148 and 150 of FIG. 4. They are conventional commercially available devices responsive to pressure in the line to which they are connected, namely, the $O_1$ output of the several devices in FIG. 5, and the $O_2$ output of the device at 72, 84 of FIG. 4. With respect to indicator 140 of FIG. 5, for example, when the $O_1$ output of switching device 122 is on, indicating that one or both of the inserts are present in the two cavities monitored by orifices 90, 92, pressure is provided to indicator 140, which thereupon provides a red signal. Visual inspection of the apparatus will then indicate that the trouble resides in one of the two cavities monitored by this device. Similarly, indicators 148 and 150 are provided to indicate existence of pressure at the $O_2$ outputs of devices 72 and 84. As long as these indicators provide the pressure indication, it is known that the fluidic sensing system is operating properly and the switches 52, 54 are closed, in their low impedance condition.

These visual indicators simply comprise a sealed cylinder having a piston slidably mounted for movement therein. The piston preferably has one colored end surface, colored either red or green as may be desired, and one end of the cylinder is made transparent. In the absence of a pressure input to the cylinder the piston rests at the other end of the cylinder. When pressure is provided in the line to which the indicator is connected, the piston moves so that the colored end surface is positioned adjacent the transparent end of the cylinder whereby the desired color, red or green, or other color as the case may be, is displayed to indicate the predetermined condition.

Where reference numerals are used in the claims, they are intended solely to facilitate comparison of the claim with the described structure and should not be construed to limit the claims in any way.

SUMMARY

It will be seen that there has been described an improved molding system for achieving simultaneous molding of multiple parts and automatically signaling or preventing operation when inserts in the mold cavities are not properly positioned or removed. A unique arrangement of fluidic gates and switches and groupings of insert sensing orifices is provided such that one sensing line may achieve sensing in multiple cavities and plural outputs of a single fluidic switch may be concomitantly employed to detect and signal different conditions.

The foregoing detailed description is to be clearly understood as given by way of illustration and example only, the spirit and scope of this invention being limited solely by the appended claims.

I claim:

1. In a control system for a molding apparatus wherein a component is placed in a mold cavity as the mold is closed, the cavity is loaded with a molding compound, and the mold is then opened for withdrawal of the component and a molded part, an alarm system for signaling absence of the component within the cavity when the mold is closed and for signaling retention of the component in the cavity when the mold is open, said alarm system comprising:

pressure sensing means connected with said mold cavity for providing a first fluid signal when said component is properly positioned in said cavity, and for providing a second fluid signal when said component is in a second position remote from its proper position within said cavity, a fluidic switching device having an input responsive to said pressure sensing means, having a first switched output, and having a second unswitched output, a mold close switch for normally enabling closing of the mold, a cavity loading switch for normally enabling loading of the cavity, first fluidic gate means responsive to one of said outputs of said fluidic switching device for actuating said mold close switch to disable closing of the mold, and second fluidic gate means responsive to the other of said outputs of said fluidic switching device for actuating said cavity loading switch to disable loading of said cavity.

2. The system set forth in claim 1, wherein said molding apparatus includes a second mold cavity adapted to have a second component placed therein substantially simultaneously with the emplacing of a component in said first-named mold cavity, wherein both said cavities are closed together and loaded together, wherein said pressure sensing means is connected in fluid communication with both of said cavities, and wherein said signals provided by said pressure sensing means represent positions of one or both of said components with respect to first and second cavities, respectively, whereby the mold will not be closed when said pressure sensing means provides an output signal indicating that one or both of the cavities has a component inserted therein, and whereby said cavities will not be loaded with molding compound when said pressure sensing means provides a signal that indicates that one or both of said components is not properly emplaced within said cavities.

3. The system of claim 1, wherein said molding apparatus comprises a group of sets of mold cavities, each said cavity adapted to have a like component placed therein and to be loaded with molding compound when the component is properly emplaced within the cavity and the mold is closed, and wherein each set of said mold cavities has connected therewith an individual one of a group of pressure sensing means, each said pressure sensing means having a sensing input in fluid communication with all of the cavities of an individual set of cavities for producing a first output signal representing one position of the components of the cavities of the associated set, and for producing a second output signal representing a second position of components with the cavities of the associated set, a plurality of fluidic switching devices, (122–128), each having an input from an individual one of said pressure sensing means, each having a first switched output, and each having a second unswitched output, said first fluidic gate means (130) having a plurality of control inputs each respectively responsive to the first switched output of a different one of said fluidic switching devices, whereby said first fluidic gate means will actuate said mold close switch when any one or more of said pressure sensing means produces its first output signal.

4. The system of claim 3, wherein said second fluidic gate means (132) has a plurality of control inputs each respectively responsive to the second unswitched output of a different one of said fluidic switching devices, whereby said second fluidic gate means will actuate said cavity loading switch when any one or more of said pressure sensing means produces its second output signal.

5. In a molding system having a plurality of cavities wherein each cavity has an insert emplaced therein, the mold is closed, the cavity is loaded with a molding compound to form a part incorporating said insert, and the mold is then opened to withdraw the part and insert from the cavity, wherein a mold drive is operated to close the mold and to emplace an insert into each of said cavities, and wherein a molding compound loading drive is operated to load molding compound into each of said cavities, the improvement comprising fluidic control means for preventing closing of the mold or loading of the molding compound whenever inserts are improperly positioned with respect to said cavities, such fluidic control means comprising mold drive disabling means connected in circuit with said mold drive, loading disabling means connected in circuit with said loading drive, fluidic control logic means responsive to positioning of said inserts within each of said cavities for generating at least one of first and second alarm signals, said first alarm signal being operable to actuate said mold drive disabling means when one or more of said inserts is in position within its associated cavity, said second alarm signal being operable to actuate said loading disabling means when one or more of said cavities does not have an insert therein.

6. The system set forth in claim 5 wherein said fluidic control logic means comprises a first fluidic switch (70) having a first output connected to actuate said mold disabling means and having a control input, a first fluidic gate (72) having a second output connected with the control input of said first fluidic switch, and having first and second control inputs, first sensing means (64, 68) having inputs connected with cavities of a first group of said cavities for providing an output to said first control input of said first fluidic gate when an insert is positioned with at least one of the cavities of said first group, second sensing means (62, 66) connected with the cavities of a second group of said cavities for providing an output to the second control input of said first fluidic gate when an insert is positioned in at least one of the cavities of said second group, whereby said gate will provide an output to said first fluidic switch when an insert is positioned within at least one cavity of said first and second groups of cavities.

7. The apparatus as set forth in claim 6 wherein said fluidic control logic means also includes
a second fluidic switch (82) having an output connected to actuate said loading disabling means, and having a control input thereto, and
a second fluidic gate (84) having an output connected to the control inputs,
said first sensing means (64, 68) including
means for providing a second output to the first control input of said second fluidic gate when an insert is not properly positioned in one or more of the cavities of said first group of cavities,
said second sensing means (62, 66) including
means for providing a second output to said second control input of said second fluidic gate when an insert is not properly positioned in one or more of the cavities of said second group of cavities,
whereby when any cavity or cavities of said first and second groups lacks a properly positioned insert therein, said second fluidic switch actuates said loading disabling means.

8. The apparatus of claim 7 wherein said first group of cavities comprises
a plurality of sets of cavities, and wherein each said sensing means comprises a set of orifices,
each orifice of a set being in fluid communication with a respective one of the cavities of an individual one of said sets of cavities, all said orifices of a set being in fluid communication with each other and with a set sensing line,
a plurality of sensing switches (122–128),
each having a first input from an individual one of said set sensing lines,
each having a first switched output, and
each having a second unswitched output,
a first fluidic OR gate (130) having
a plurality of control inputs each connected to the switched output of a different one of said fluidic sensing switches and having an output,
a second fluidic OR gate (132) having
a plurality of control inputs each connected to a respective one of the unswitched outputs of said fluidic sensing switches, the output of said first fluidic OR gate (130) being connected to said first control input of said first fluidic gate (72), and the output of said second fluidic OR gate (132) being connected to said first control input of said second fluidic gate (84).

9. A molding system comprising:
a mold body having a mold cavity,
an insert receiving seat in the cavity,
a movable mold member mounted to close said mold cavity and maintain an insert within said cavity positioned upon said seat,
said movable mold member having a passage therein in fluid communication with a fluid pressure system external to the mold,
a passage formed in said mold seat and extending therethrough into fluid communication with said passage of said movable mold member when the latter is positioned to close the mold and said insert is not emplaced upon said seat,
said insert blocking communication between the said seat passage and movable mold member passage when properly positioned upon said seat,
said seat passage being in fluid communication with a fluid pressure system external to the mold,
insert sensing means interposed between one of said passages and its communication with its pressure system, said insert sensing means comprising
a fluid pressure sensing line in fluid communication with said one passage,
means for supplying fluid pressure to said sensing line, and fluidic switching means having an input responsive to pressure in said fluid pressure sensing line for providing an output indicative of presence or absence of an insert positioned upon said seat.

10. The system of claim 9,
wherein said one passage is said seat passage,
wherein said pressure system in communication with said movable mold member passage is a vacuum system, and
wherein said pressure system communicating with said seat passage is a fluid supply system.

11. The molding system of claim 9 including
a movable mold member drive,
a mold compound loading drive, and
control means responsive to said fluidic switching means for disabling at least one of said drives.

12. The molding system of claim 9 including
a movable mold member drive,
first control means responsive to said fluidic switching means for disabling said movable mold member drive when an insert is positioned upon said seat.

13. The system of claim 9 including
a mold compound loading drive,
control means responsive to said fluidic switching means for disabling said mold compound loading drive when no insert is positioned upon said seat.

14. The system of claim 9 wherein said mold includes
a plurality of cavities, each having
a cavity seat,
a cavity seat passage,
a movable mold member, and
movable mold member passage connected and arranged as are the like elements set forth in claim 9,
a plurality of fluid pressure sensing lines, each in fluid communication with different sets of said seat passages,
said fluidic switching means comprising
a plurality of fluidic sensing switches, each having a control input from at least one of said pressure sensing lines,
a fluidic OR gate responsive to said plurality of fluidic sensing switches for providing a first output when one or more of said mold cavity seats has an insert positioned thereon and for providing a second distinct output when one or more of said mold cavity seats does not have an insert positioned thereon, means responsive to said first output for disabling movement of said movable mold member, and
means responsive to said second output for disabling loading of molding compound into said cavities.

15. In a molding system having a plurality of cavities wherein each cavity has an insert emplaced therein, the mold is closed, the cavity is loaded with a molding compound to form a part incorporating said insert, and the mold is then opened to withdraw the part and insert from the cavity, wherein a mold drive is operated to close the mold and to emplace an insert into each of said cavities, and wherein a molding compound loading drive is operated to load molding compound into each of said cavities, the improvement comprising:
fluidic control means for signalling whenever inserts are improperly positioned with respect to said cavities, such fluidic control means comprising
mold drive alarm means,
loading alarm means,
fluidic control logic means responsive to positioning of said inserts within each of said cavities for generating first and second alarm signals,
said first alarm signal being operable to actuate said mold drive alarm means when one or more of said inserts is in position within its associated cavity, and
said second alarm signal being operable to actuate said loading alarm means when one or more of said cavities does not have an insert therein.

16. A molding system comprising:
a mold body having a mold cavity,
a movable mold member mounted to close said mold cavity and maintain an insert positioned within said cavity, said movable mold member having a passage therein in fluid communication with a negative fluid pressure system external to the mold body, a sensing passage formed in said mold body and extending therethrough into fluid communication with said passage of said movable mold member when the latter is positioned to close the mold cavity and said insert is not properly positioned within said cavity, said insert blocking communication between the said sensing passage and movable mold member passage when properly positioned within said cavity, said sensing passage being in fluid communication with a positive fluid pressure system external to the mold body, insert sensing means interposed between said sensing passage and its communication with its pressure system, said insert sensing means comprising, a fluid pressure sensing line in fluid communication with said sensing passage, means for supplying fluid pressure to said sensing line, and fluidic switching means having an input responsive to pressure in said fluid pressure sensing line for providing an output indicative of presence or absence of an insert positioned within said cavity.

17. The system of claim 16 wherein said movable mold member comprises a long slender core pin having a free end that is movable into said cavity to a position closely adjacent said sensing passage, wherein said movable mold member passage comprises a longitudinal bore extending through said core pin, wherein said insert is retained upon said free end of said core pin during movement of said mold member to close said cavity by negative pressure drawn upon said bore by said negative pressure system, whereby fluid will flow from said positive fluid pressure system through said sensing passage and core pin bore to said negative pressure system when said insert is not properly positioned upon said free end of said core pin within said cavity.

* * * * *